(12) United States Patent
Hasegawa

(10) Patent No.: US 8,208,589 B2
(45) Date of Patent: Jun. 26, 2012

(54) RECEIVER AND RECEPTION PROCESSING METHOD

(75) Inventor: Tsuyoshi Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1073 days.

(21) Appl. No.: 12/123,232

(22) Filed: May 19, 2008

(65) Prior Publication Data

US 2009/0010313 A1  Jan. 8, 2009

(30) Foreign Application Priority Data

Jul. 2, 2007  (JP) .................................. 2007-174184

(51) Int. Cl.
*H04L 1/02* (2006.01)
*H04B 7/08* (2006.01)

(52) U.S. Cl. ........................................ 375/347; 455/137

(58) Field of Classification Search .................. 375/130, 375/140, 144, 147, 148, 267, 316, 346, 347, 375/340, 350; 455/130, 132–135, 137
See application file for complete search history.

(56) References Cited

U.S. PATENT DOCUMENTS

| | | | | |
|---|---|---|---|---|
| 6,768,729 | B1 * | 7/2004 | Ohsuge | 370/342 |
| 7,085,311 | B2 * | 8/2006 | Iwasaki | 375/147 |
| 2003/0026233 | A1 | 2/2003 | Ohsuge | |
| 2004/0228272 | A1 | 11/2004 | Hasegawa et al. | |
| 2005/0058183 | A1 * | 3/2005 | Ogawa et al. | 375/148 |
| 2006/0068790 | A1 * | 3/2006 | Sawamoto et al. | 455/441 |
| 2006/0268962 | A1 | 11/2006 | Cairns et al. | |

FOREIGN PATENT DOCUMENTS

| | | |
|---|---|---|
| JP | 3031354 | 2/2000 |
| JP | 2002-280943 | 9/2002 |
| JP | 2004064235 A | 2/2004 |
| JP | 2005-354263 | 12/2005 |
| JP | 2007129385 A | 5/2007 |
| WO | WO 03/032541 | 4/2003 |
| WO | 2004017655 A1 | 2/2004 |

OTHER PUBLICATIONS

Notification of Reasons for Refusal Office Action dated Sep. 13, 2011 received in Japanese Patent Application No. 2007-174184.
Extended European Search Report dated Jul. 29, 2010 in corresponding Application No. 08156799.2-2411/2012439.
Tsuyoshi Hasegawa, et al: "Inter-Cell Interference Suppression Effect Using a Chip Correlation MMSE Receiver with Mulipath Interference Correlative Timing" Vehicular Technology Conference, 2007. VTC2007-Spring, IEEE 65th, IEEE, Pl Apr. 1, 2007, pp. 1732-1736, XP031092926.
Japanese Decision of Rejection dated Dec. 6, 2011 issued in application No. 2007-174184.

\* cited by examiner

*Primary Examiner* — Tesfaldet Bocure
(74) *Attorney, Agent, or Firm* — Murphy & King, P.C.

(57) ABSTRACT

A receiver including: a delay profile generating unit to generate a delay profile from a received signal; combining unit operable to combine multiple received signals with different timings; a determining unit to determine whether or not the propagation environment of the received signals is multipath, based on the delay profile; and a control unit operable to exclude any signal with timing whose power is equal to or lower than a predetermined threshold in the delay profile from the combining, upon the determination not being multi-path.

14 Claims, 12 Drawing Sheets

RECEIVER AND RECEPTION PROCESSING METHOD

CROSS REFERENCE TO RELATED APPLICATION(S)

This application is based on and hereby claims priority to Japanese Application No. 2007-174184 filed on Jul. 2, 2007 in Japan, the contents of which are hereby incorporated by reference.

BACKGROUND OF THE INVENTION (1) Field of the Invention

The present invention relates to receivers and reception processing methods. The present invention may be used in a receiver system in a CDMA wireless terminal, for example.

(2) Description of the Related Art

In recent years, many studies on high-speed and high capacity mobile communication method have been done. As a part of this trend, developments of high-speed wireless communication method using CDMA scheme, including HSDPA (High Speed Downlink Packet Access), have been increasing.

HSDPA provides near-highest transmission speed in a given radio propagation environment by adaptively changing the transmission format depending on the given environment.

Therefore, in an environment in which the radio propagation path is one-path or near one-path (hereinafter collectively referred to as "one-path environment"), a transmission format that allows fast transmission is used, but if such a format is used, the performance may be significantly degraded by the mixing of small noise.

On the other hand, in the CDMA scheme, a RAKE receiver may be used. The RAKE receiver improves receiving performance by combining multiple delayed waves, but in one-path environment, it often causes false detection of delayed waves, and as a result, it combines noise components, which may degrade the receiving performance.

For example, as illustratively shown in FIG. 10, the receiving performance may be improved by uniformly determining a delayed wave whose amplitude (power) is lower than a predetermined reference value (power of path timing shown as x) as noise and excluding it from the combining. This process is referred to as limit process.

Related known arts are disclosed in the following Patent References 1-3, for example.

Patent Reference 1 discloses that, in order to allow the reception condition (receiver sensitivity) and received power measuring performance to be improved in a multi-path environment, delay profile which is the distribution of signal correlation value power of spread spectrum signals incoming via multiple paths versus delay time, is periodically measured, the predetermined number of path delays with higher signal correlation value power in each of multiple measurement results of the delay profile are compared to each other; and a path whose path delay is within a predetermined error is selected as an effective path.

Patent Reference 2 discloses that, in order to provide a wireless communication apparatus equipped with an array antenna and having a simple and reliable path detection function, delay profile is generated by despreading for certain codes of output from an array antenna device; any path whose element of the delay profile is equal to or lower than a threshold is assumed to be zero; the delay profile is summed or averaged in beams; and a path whose power after summing or averaging is equal to or more than a threshold is selected as a path detection result.

Patent Reference 3 discloses that, in order to allow channel estimation to be successful even if received power of a delayed wave is higher than that of a direct wave, a channel estimate is determined from the result of FFT operation of known data included in the received signal; a delay profile of the multi-path is determined by performing IFFT operation on the channel estimate; and a starting position of FFT operation is determined according to the position of a path whose power is the highest within the delay profile.

[Patent Reference 1] JP 2005-354263
[Patent Reference 2] WO 2003/032541
[Patent Reference 3] JP 2002-280943

The inventor of the present invention has found that the above described limit process can improve performance in one-path environment, but in multi-path environment, it degrades performance instead of improving, particularly when moving fast. This is probably because, for example, as illustratively shown in FIG. 11, a delayed wave determined to be noise component in limit determination may become larger by fading in demodulation, or a delayed wave determined to be signal component in the limit determination may become smaller in demodulation. Furthermore, the limit process does not work well since there is a certain limit to the improvement in accuracy of path power estimation. This may also be a cause of the performance degradation.

FIG. 12 shows a performance (throughput) versus threshold of limit determination (hereinafter referred to as "limit threshold") in one-path and multi-path environments (PB3 and VA120, respectively). In FIG. 12, a curve 100 indicates the performance versus limit threshold in one-path environment, and curves 200 and 300 each indicate the performance versus limit threshold in multi-path environment.

As seen from the curves 100, 200, and 300, in one-path environment, higher limit threshold provides better performance, but in multi-path environment such as PB3 (moving environment at 3 km/h) and VA120 (moving environment at 120 km/h), higher limit threshold provides degraded performance because of poor accuracy of the limit process performing determination. This means that there is a trade-off between the limit threshold and the performance.

In above mentioned Patent References 1-3, there is no disclosure or suggestion regarding a limit process in which such a trade-off is considered.

SUMMARY OF THE INVENTION

It is an object of the present invention to improve performance in one-path environment while reducing performance degradation in multi-path environment.

Not limited to the above object, it is another object of the present invention to provide operation and effect, that is not provided by prior art, resulted from embodiments described in DESCRIPTION OF THE PREFERRED EMBODIMENT (S) later.

The present invention may use a receiver and a reception processing method as follows.

(1) A receiver includes: a delay profile generating unit to generate a delay profile from a received signal; a combining unit operable to combine multiple received signals with different timings; a determining unit to determine whether or not the propagation environment of the received signals is multi-path, based on the delay profile generated by the delay profile generating unit; and a control unit operable to exclude any signal with timing whose power is equal to or lower than a predetermined threshold in the delay profile from combining by the combining unit, upon determination by the determining unit not being multi-path.

(2) The determining unit may determine the propagation environment not being multi-path, upon the ratio between the power of path timing whose power is the highest and the sum of power of the rest of path timings in the delay profile being higher than a predetermined reference value.

(3) Alternatively, the determining unit may determine the propagation environment not being multi-path, upon the ratio between the power of path timing whose power is the highest and the power of path timing whose power is the second highest in the delay profile being higher than a predetermined reference value.

(4) The control unit may exclude any signal with path timing whose power is equal to or lower than the predetermined threshold from the combining by setting to zero the weightedly combining factor for the combining unit corresponding to the signal.

(5) Multiple received signals with different timings being subjected to combining by the combining unit may be signals with path timings in the delay profile.

(6) A reception processing method includes the steps of: generating a delay profile from a received signal; combining multiple received signals with different timings; determining whether or not the propagation environment of the received signals is multi-path, based on the delay profile generated by the generating step; controlling such that, upon the propagation environment being determined not being multi-path by the determining step, any signal with timing whose power is equal to or smaller than a predetermined threshold in the delay profile is excluded from the combining step.

(7) The determining step may determine the propagation environment not being multi-path, upon the ratio between the power of path timing whose power is the highest and the sum of power of the rest of path timings in the delay profile being higher than a predetermined reference value.

(8) Alternatively, the determining step may determine the propagation environment not being multi-path, upon the ratio between the power of path timing whose power is the highest and the power of path timing whose power is the second highest in the delay profile is higher than a predetermined reference value.

(9) The controlling step may exclude any signal with path timing whose power is equal to or lower than the predetermined threshold from the combining by setting to zero the weightedly combining factor for the combining unit corresponding to the signal.

(10) The multiple received signals with different timings being subject to combine in the combining step may be signals with path timings in the delay profile.

The above-described technique can improve performance in one-path environment while reducing performance degradation in multi-path environment.

The above and other objects and features of the present invention will be understood by reading carefully the following description with accompanying drawings. Preferred embodiments of the present invention will be described in more detail referring to the accompanying drawings. The drawings are illustrative and are not to be limitative of the scope of the present invention.

DESCRIPTION OF THE PREFERRED EMBODIMENT(S)

Preferred embodiments of the present invention are described in more detail below referring to the accompanying drawings.

It is apparent to the person skilled in the art that the present invention is not limited to embodiments described below, and various modifications may be used without departing from the spirit of the present invention.

[A] A First Embodiment

The above mentioned problem can be solved by selectively performing a limit process depending on a given propagation environment. For example, instead of being always performed, the limit process is performed when a given propagation environment is determined to be one-path environment after the long-time measurement of the environment. This can improve performance in one-path environment while reducing performance degradation in multi-path environment. Note that an overflowing path from the physically combinable number of paths (N) (for example, the N+1-th or later path when arranged in the order of decreasing correlation) is excluded from the combining (this exclusion is different process from the limit process).

Whether a given environment is one-path or not can be determined based on the ratio between the highest path power (power of path whose power is the highest) and the sum of power of the rest of paths in the delay profile measured for a sufficiently longer time than that of fading variation and averaged (hereinafter referred to as "path profile").

Figure 2:
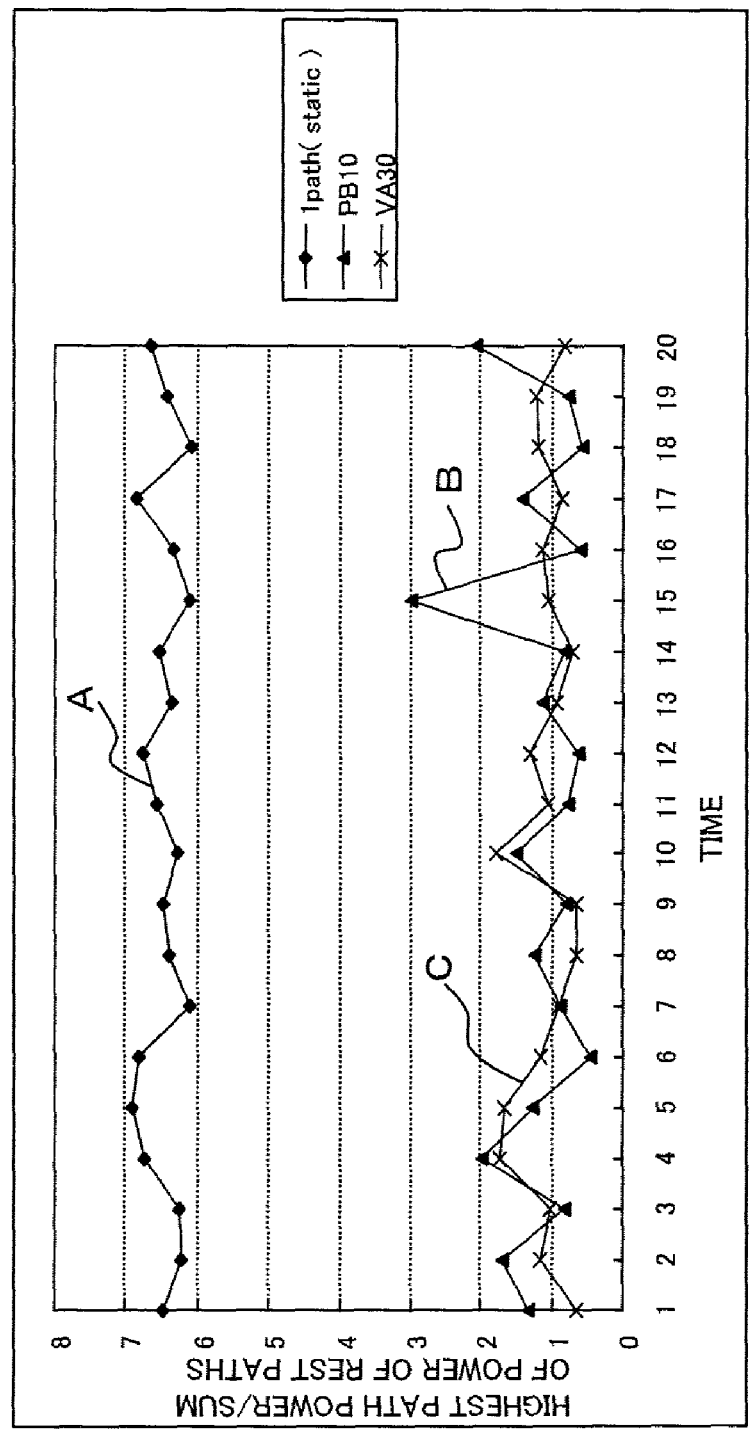
FIG. 2 is a graph showing the ratio between the highest path power and the sum of power of the rest of paths for the purpose of illustrating the limit process performing determination in accordance with the first embodiment.

For example, FIG. 2 shows a time variation of the ratio for a typical multi-path environment (PB10, VA30) and a one-path environment (static environment), where PB10 and VA30 denote a moving environment at 10 km/h and 30 km/h, respectively. As seen from FIG. 2, the distribution of the ratio is obviously different between one-path environment (marked as "A") and multi-path environment (marked as "B" and "C").

Figure 1:
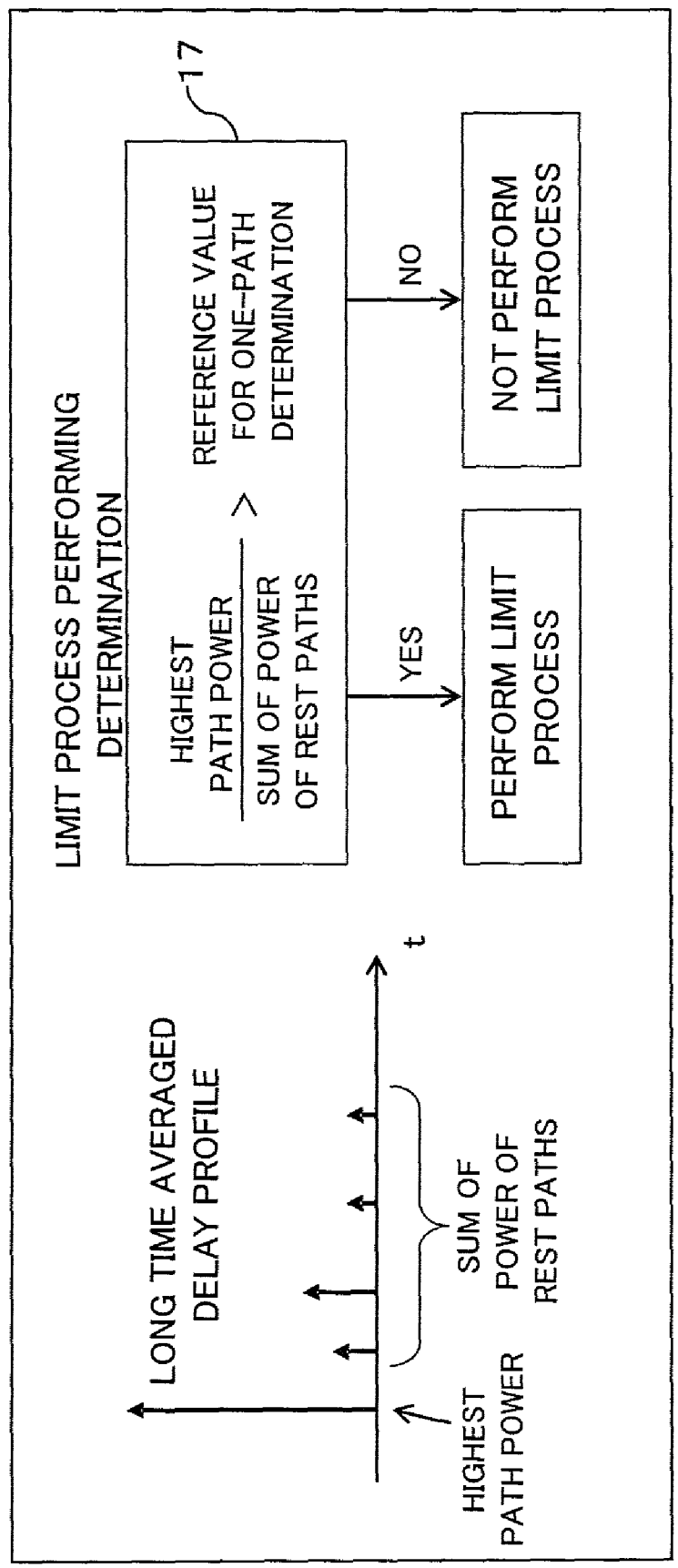
FIG. 1 illustrates a limit process performing determination in accordance with a first embodiment.

Therefore, the following control is possible (for example, as shown in FIG. 1): if the ratio between the highest path power and the sum of power of the rest of paths is higher than a predetermined reference value (reference value for one-path determination, which may be 4 or so in the example in FIG. 2), the limit process is performed; otherwise, the limit process is not performed.

Figure 3:
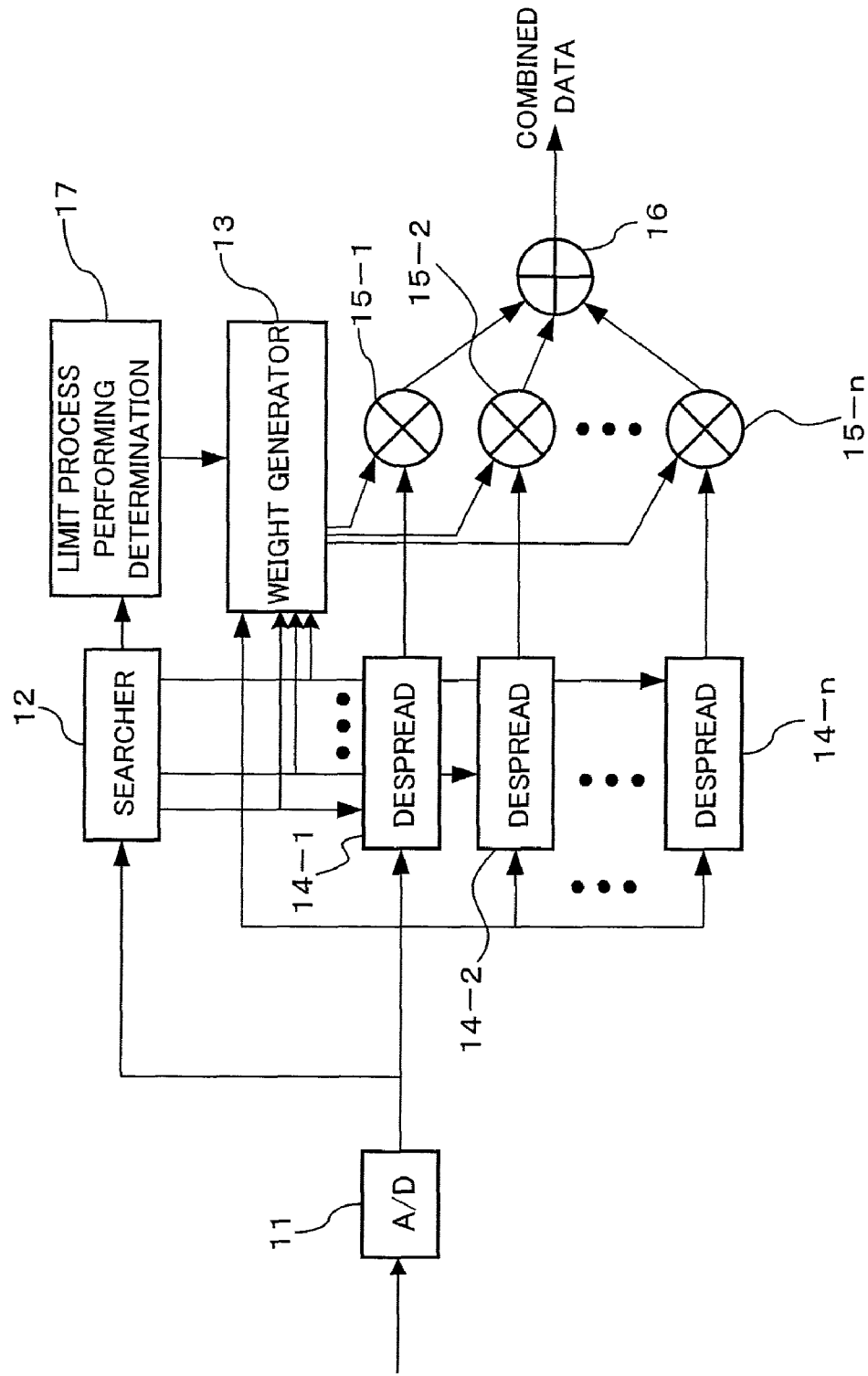
FIG. 3 is a block diagram of a RAKE receiver in a CDMA receiver in accordance with the first embodiment.

FIG. 3 is a block diagram of a RAKE receiver in a CDMA receiver in accordance with a first embodiment. The RAKE receiver shown in FIG. 3 is applicable to a receiver system of a wireless terminal such as mobile phone, and includes, for example, an A/D converter 11, a searcher 12, a weighting factor generator 13, despreaders 14-1 to 14-n (n is an integer greater than 1, corresponding to the number of fingers), multipliers (15-1 to 15-n), an adder 16, and a limit process performing determination part 17.

The A/D converter 11 converts a signal (analog baseband signal) that is received by a receiving antenna (not shown) and subjected to necessary radio reception processes including low-noise amplification, frequency conversion (down conversion), automatic gain control (linear amplification), and quadrature detection, into a digital signal.

The searcher (delay profile generating means) 12 performs path search using e.g. a matched filter for the output of the A/D converter 11 (the received signal before being despread by the despreaders 14-1 to 14-n), generates a delay profile (a distribution of signal correlation value power of signals incoming via multiple paths versus delay time), and provides the information of each path timing to the weighting factor generator 13 and the despreaders 14-i (i=1 to n). The delay profile will be measured for a sufficiently longer time than that of fading variation and averaged, after performing the path search multiple times.

Each despreader 14-i despreads the output of the A/D converter 11 with the path timing given by the searcher 12. The weighting factor generator 13 determines correlation values (a correlation matrix) among the paths based on the output of the A/D converter 11 and information for each path timing given by the searcher 12, and generates a weighting factor (Rake combining factor) Wi for the despread output of the despreader 14-i based on a corresponding correlation value and a channel estimate that is derived from a known signal (pilot signal) with each path timing.

Each multiplier 15-i multiplies the despread output of the corresponding despreader 14-i by the weighting factor Wi generated by the weighting factor generator 13. The adder (combining means) 16 sums (combines) the multiplied outputs of the multipliers 15-i (received signals with different timings) In other words, the block having the multipliers 15-i and the adder 16 works as a RAKE combining circuit for weightedly combining (RAKE combining) the despread outputs.

Based on the delay profile generated by the searcher 12, the limit process performing determination part (determining means) 17 determines whether the propagation environment of the received signal is one-path or multi-path, by determining whether or not the ratio between the highest path power and the sum of power of the rest of paths is higher than a reference value for one-path determination, as explained with reference to FIGS. 1 and 2, and controls the weighting factor generator 13 such that, if the environment is determined to be one-path, the limit process is performed, and otherwise, the limit process is not performed.

The limit process can be performed, for example, such that the weighting factor generator 13 sets to zero the weighting factor Wi corresponding to signals with path timing whose power of channel estimate is lower than a reference value. In other words, the weighting factor generator 13 works as a control means for excluding a signal with timing whose power is equal to or lower than a predetermined threshold in the delay profile from combining by the adder 16 when the propagation environment of the received signal is determined not to be multi-path (but to be one-path) by the limit process performing determination part 17.

The operation of a RAKE receiver configured as the above will be described below. A signal that is received by the receiving antenna is subjected to necessary radio reception process including low-noise amplification, frequency conversion (down conversion), automatic gain control (linear amplification), and quadrature detection. Then the signal is input to the A/D converter 11, is converted to a digital baseband signal by the A/D converter 11, and input to the searcher 12, the weighting factor generator 13, and each despreader 14-i.

The searcher 12 performs path search for the output of the A/D converter 11, generates a delay profile measured for a sufficiently longer time than that of fading variation and averaged, and provides highly correlated path timings to the despreaders 14-i The despreader 14-i despreads the signal input by the A/D converter 11 using the path timing from the searcher 12 as despreading timing. Each of the results of despreading is input to corresponding multiplier 15-i.

In the meantime, the limit process performing determination part 17 performs the one path determination as described above based on the delay profile generated by the searcher 12. If the environment is determined to be one path, the limit process is performed. If the environment is determined to be multi-path, the limit process is not performed.

More specifically, if the environment is determined to be one path, the weighting factor generator 13 sets to zero a weighting factor Wi for a path whose power of channel estimation is lower than a reference value. If the environment is determined to be multi-path, the weighting factor generator 13 validates a weighting factor Wi for each generated path timing and provides each weighting factor Wi to the multiplier 15-i.

The multiplier 15-i multiplies the result of despreading by the weighting factor Wi generated by the weighting factor generator 13. The outputs from the multipliers 15-i is summed by the adder 16, and is output as a result of weighted combining.

Thus the RAKE receiver in accordance with this embodiment determines whether or not the limit process is to be performed, by determining whether the environment is one-path or multi-path based on the delay profile from the path search in the limit process performing determination part 17, and performs the limit process only when the environment is determined to be one-path. Therefore the RAKE receiver allows performance improvement in one-path environment while reducing performance degradation in multi-path environment.

[B] A Second Embodiment

Figure 5:
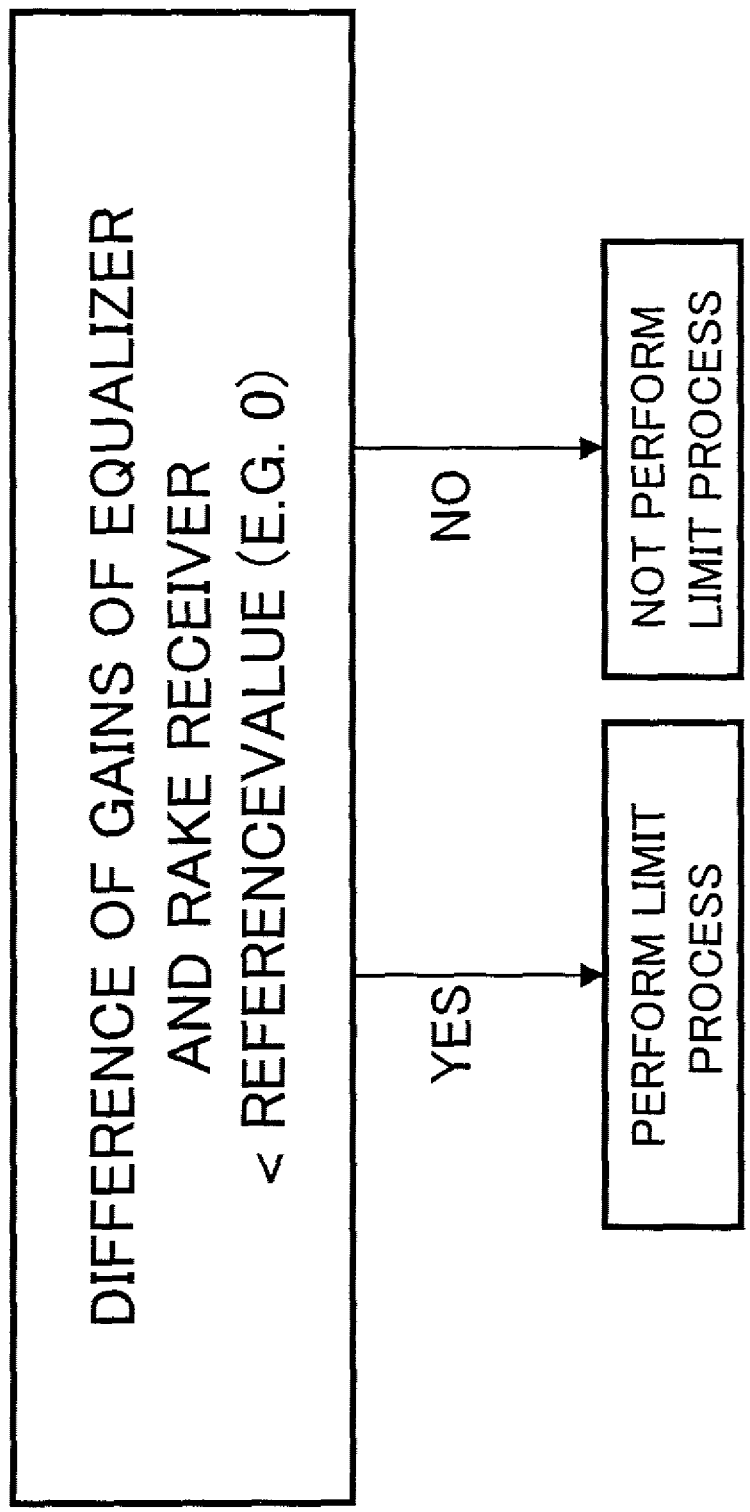
FIG. 5 illustrates the limit process performing determination in accordance with the second embodiment.
Figure 6:
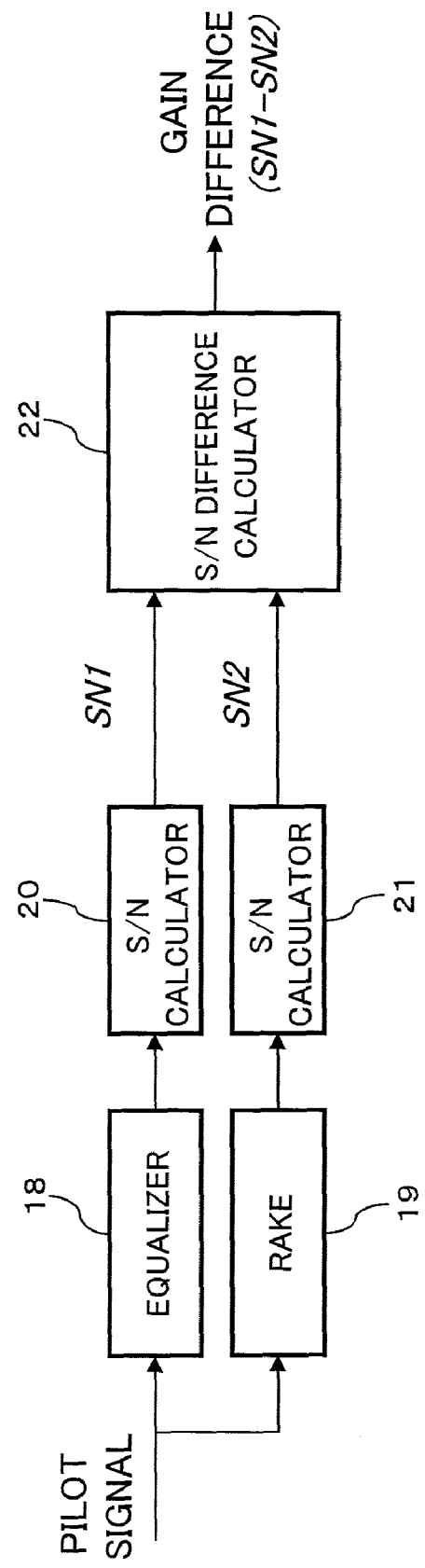
FIG. 6 is a block diagram illustrating a calculation of the difference of gains shown in FIG. 5.
Figure 7:
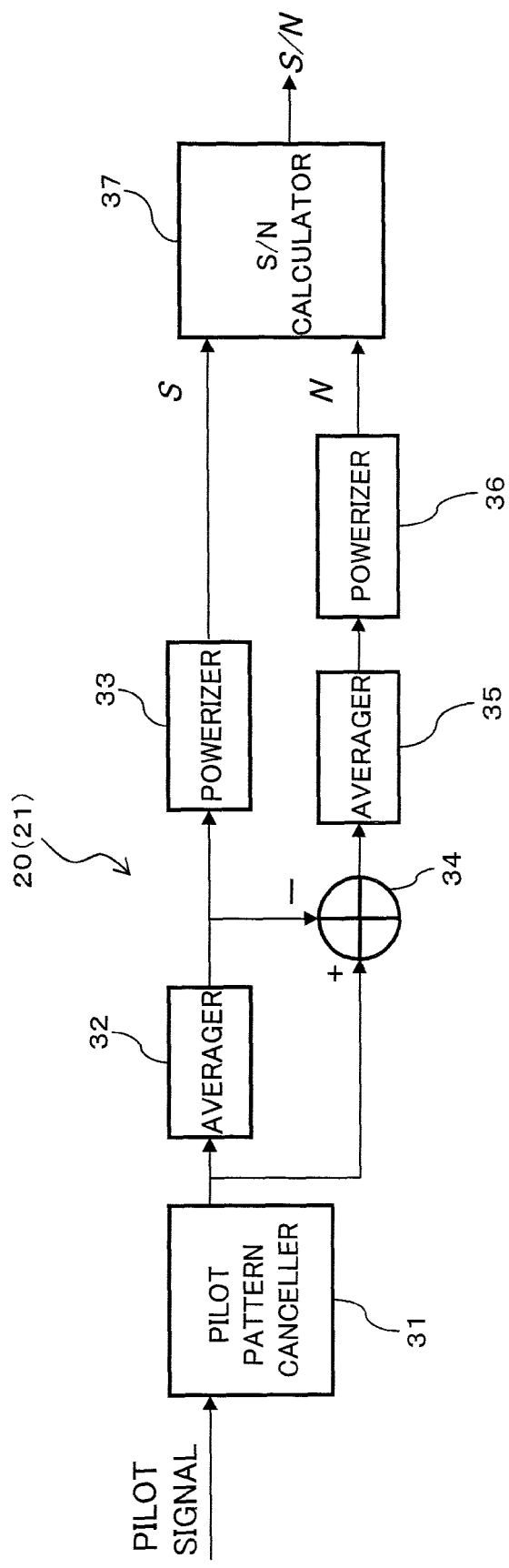
FIG. 7 is a block diagram illustrating a S/N calculation shown in FIG. 6.

FIGS. 5 to 7 illustrate the limit process performing determination process in a CDMA receiver in accordance with a second embodiment. This process is a modification of the process of the limit process performing determination by the limit process performing determination part 17 shown in FIGS. 1 and 3, and uses an equalizer.

As shown in FIG. 5, the limit process is performed when the difference between the gain of the equalizer of the CDMA receiver and the gain of the RAKE receiver is lower than a predetermined reference value (for example, 0).

FIG. 6 shows an example of configuration for calculating the difference of the gains. In this configuration, a known signal (pilot signal) is input to an equalizer 18 and a RAKE receiver 19. S/N calculators 20 and 21 calculate (estimate) the S/N ratios of the output from the equalizer 18 and RAKE receiver 19, respectively. An S/N difference calculator 22 calculates the difference between the S/N ratios. Thus the difference of the gain between the equalizer 18 and RAKE receiver 19 can be calculated.

FIG. 7 shows a typical example of configuration of the S/N calculator 20 (21) that calculates (estimates) the S/N ratios.

In the S/N calculator 20 (21), the known signal (pilot signal) is input to a pilot pattern canceller 31, which cancels the pilot component (pilot pattern) of the received signal. An averager 32 averages the output signal from the pilot pattern canceller 31 over a required symbols. A powerizer 33 powerizes the average to provide the power value of the signal component (S). A subtractor 34 calculates the difference of signals before and after the averaging by the averager 32.

The difference is averaged by a averager 35 and powerized by a powerizer 36 to provide the power value of the noise component (N). Then an S/N calculator 37 calculates the ratio of the power values of the signal component (S) and noise component (N) to provide S/N of the input signal that is the output of the equalizer 18 (or the RAKE receiver 19).

Figure 4:
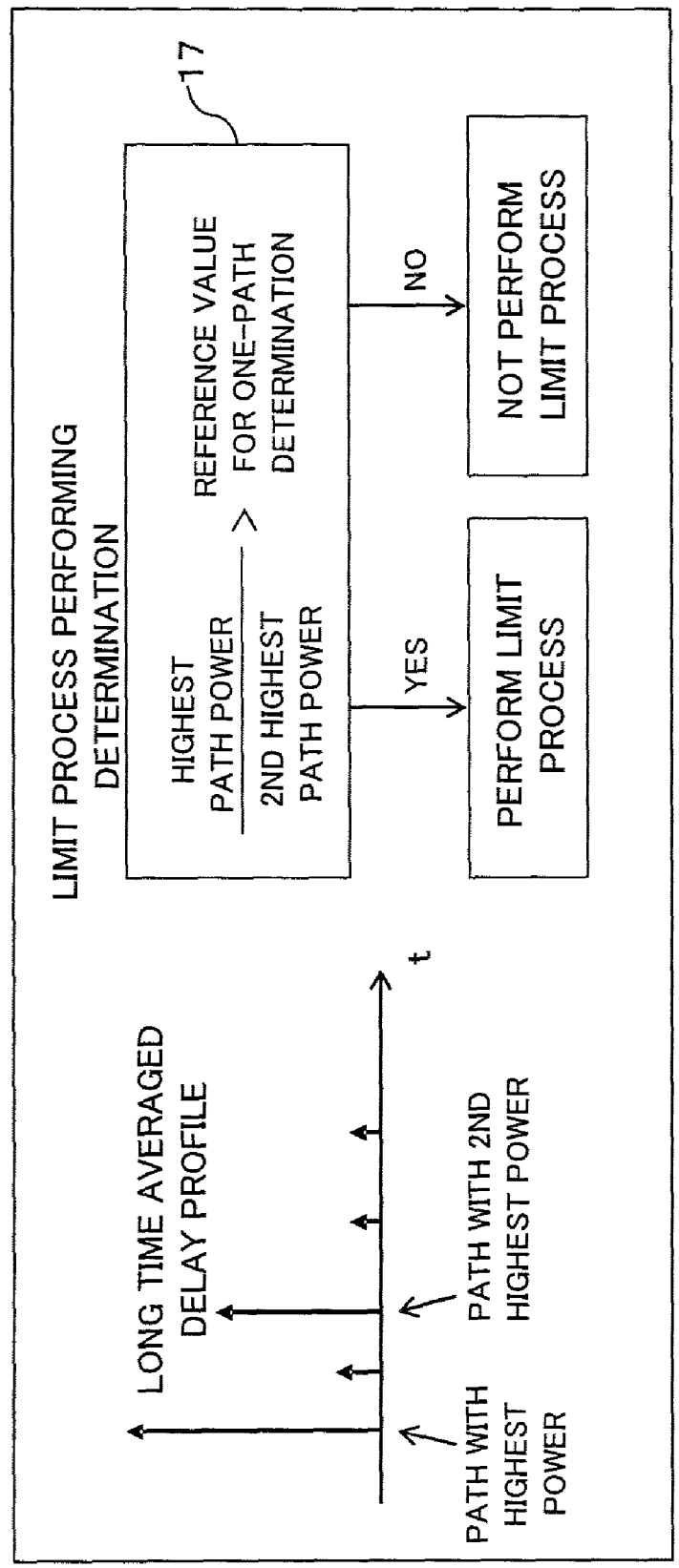
FIG. 4 illustrates a limit process performing determination in accordance with a second embodiment.

FIG. 4 illustrates a simplified version of the method considering enormous amounts of calculation needed for the process shown in FIGS. 5 to 7. In this simplified method, whether or not the limit process is to be performed is determined by roughly estimating the gain of the equalizer 18.

In the limit process performing determination process shown in FIG. 4, if the ratio of power between the path with the highest power and the path with the second highest power in the delay profile is higher than a predetermined reference value (reference value for one-path determination), the environment is determined to be one-path and the limit process is performed; and if the above ratio is equal to or lower than the reference value for one-path determination, the environment is determined to be multi-path and the limit process is not performed.

The average gain of the equalizer can be estimated from the delay profile. In FIG. 4, it is estimated from the ratio of power of two paths with the highest and second highest power. When this ratio of power is high to some extent, the gain of the equalizer is low. Therefore, the limit process is performed when the ratio of power is higher than the reference value of one-path determination. In other words, the limit process is ON/OFF-controlled depending on the result of estimating the gain of the equalizer.

In general, the larger the number of path is, the lower the gain of the equalizer 18 tends to be. Therefore the gain of the equalizer 18 in multi-path environment is lower than the gain estimated from two paths with the highest power and second highest power among the multiple paths.

In other words, if the gain estimated from two paths with the highest power and second highest power is sufficiently low, the gain of the equalizer is also sufficiently low. Since the gain estimated from two paths is calculated by using the ratio of power and the reception S/N ratio of the two paths, the determination based on the ratio of power of the two paths depending on the reception S/N ratio provides an effect comparable to the determination using "the difference of the gain" shown in FIG. 5 with less throughput.

Figure 8:
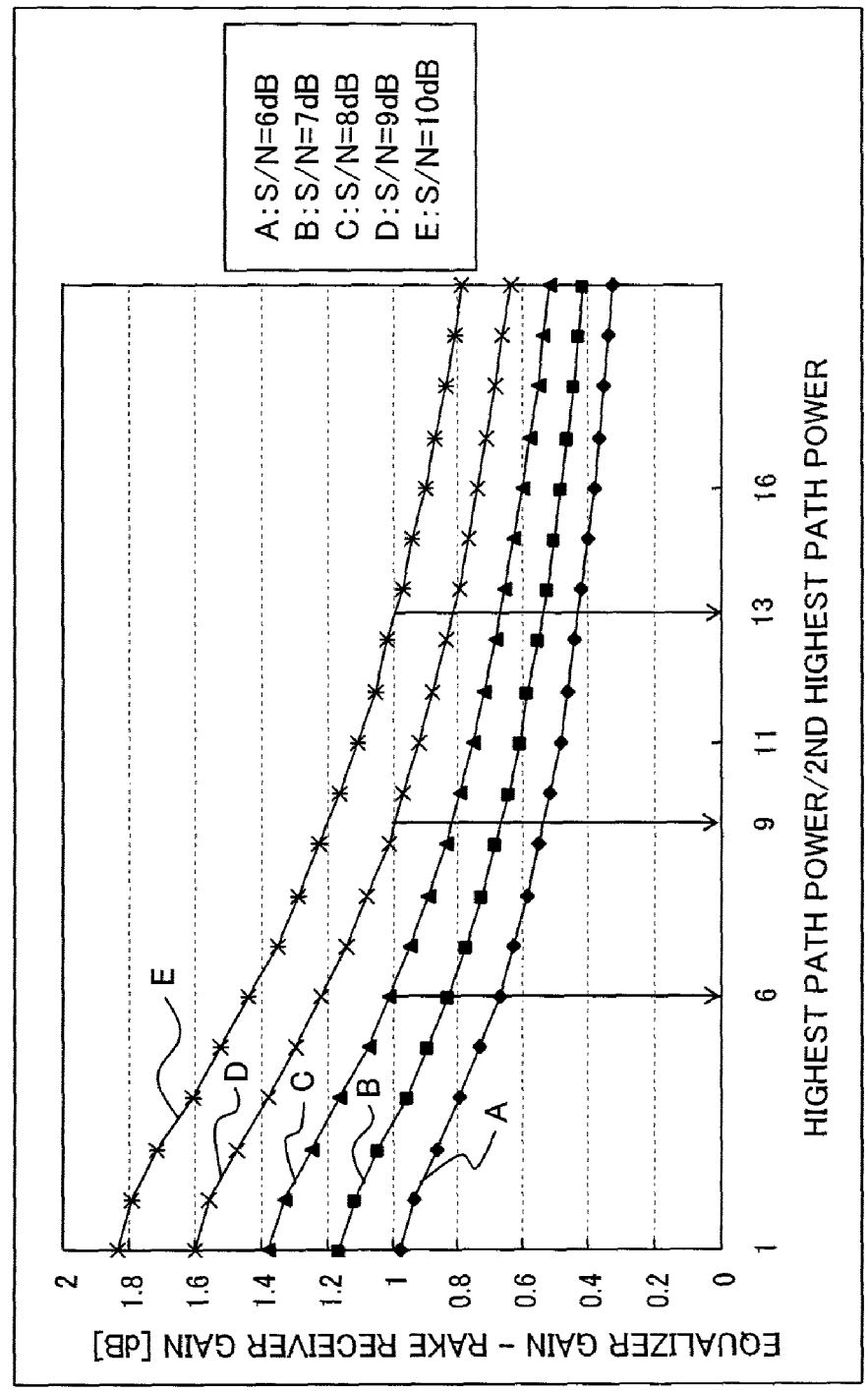
FIG. 8 is a graph showing the relationship of the ratio between the highest path power and the second highest path power versus the difference of gains for the purpose of illustrating a reference value for the limit process performing determination in accordance with the second embodiment.

FIG. 8 shows the relationship between the difference of the gains and the ratio of power of the two paths under an ideal condition. In FIG. 8, curves "A", "B", "C", "D", and "E" indicate the relationship (the difference of the gain versus the ratio of power) with the reception S/N ratio of 6, 7, 8, 9, and 10 dB, respectively.

The graph shown in FIG. 8 suggests that, for example, in order to perform the limit process when the difference of the gain is lower than 1 dB, "reference value for one-path determination" should be set to 13 if the S/N ratio is 10 dB (see curve E). Similarly, if the S/N ratio is 9 dB (see curve D), the reference value should be set to 9. If the S/N ratio is 8 dB (see curve C), the reference value should be set to 6, and so on.

[C] A Third Embodiment

Figure 9:
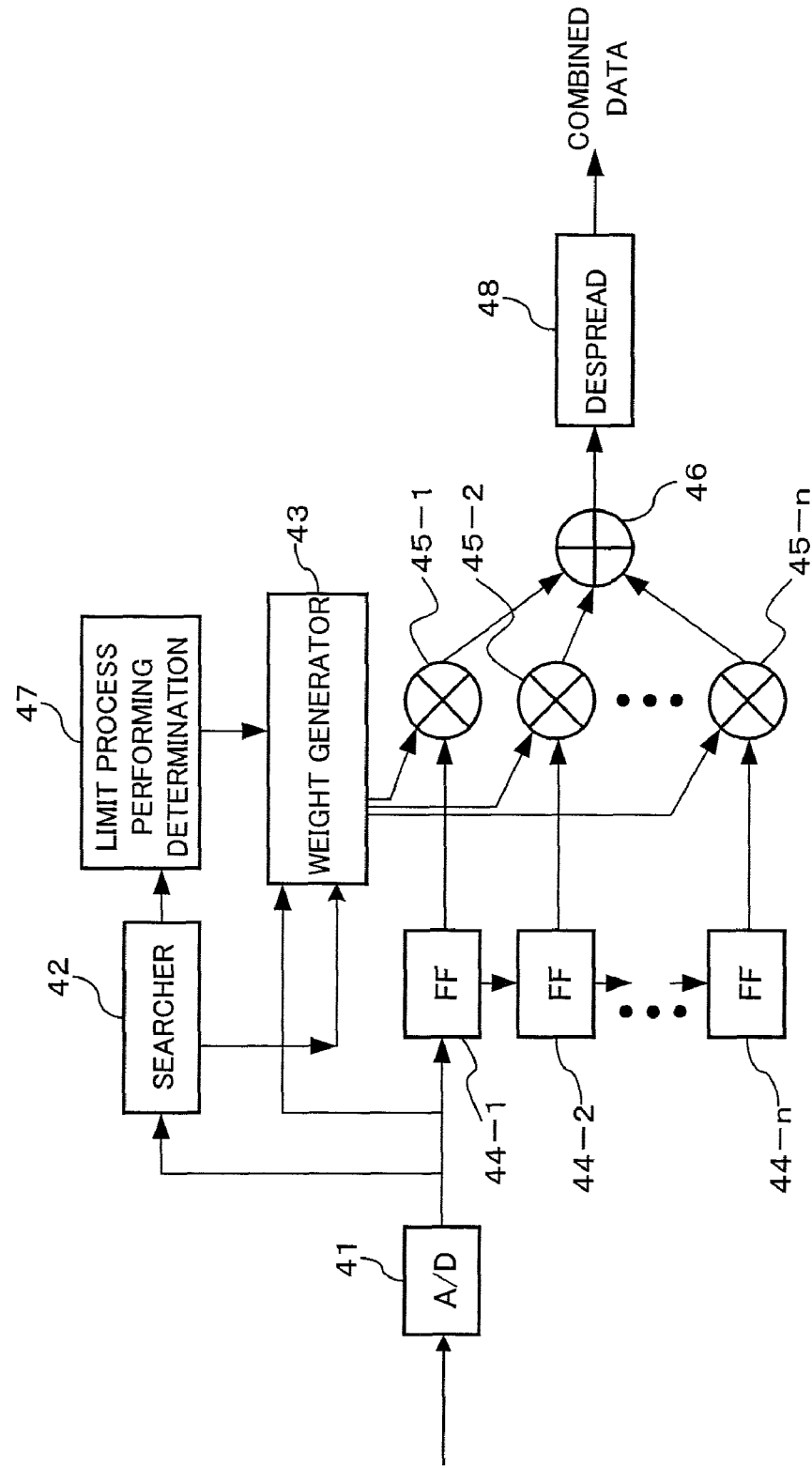
FIG. 9 is a block diagram of an equalizer in a CDMA receiver in accordance with a third embodiment.
Figure 10:
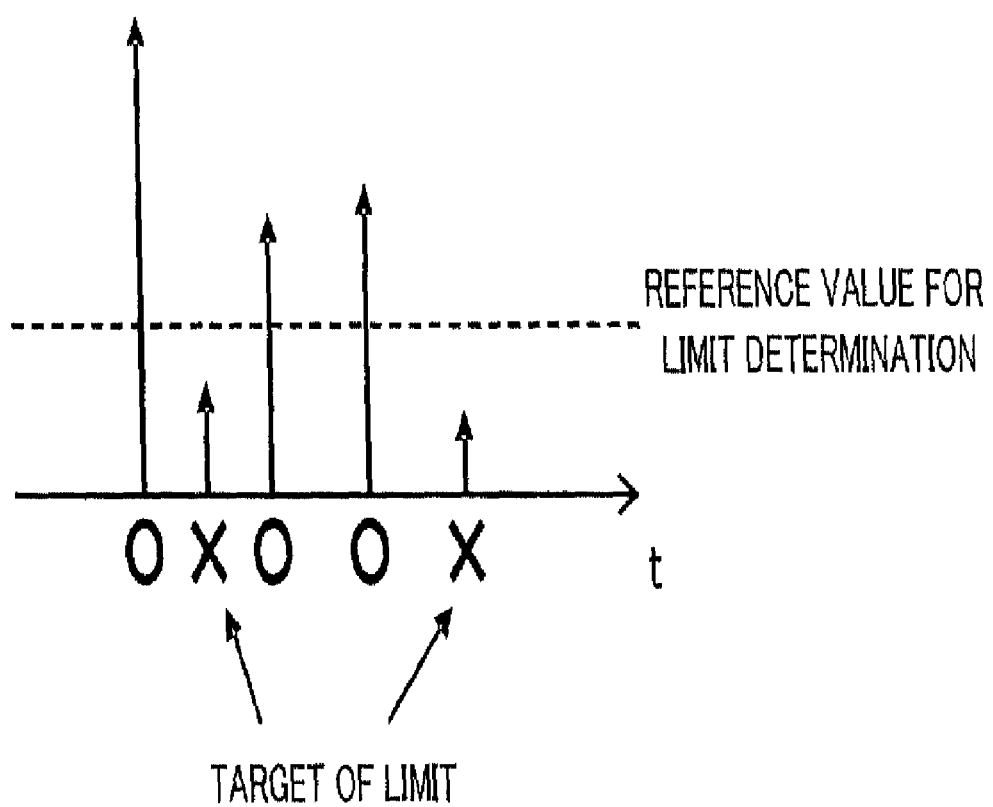
FIG. 10 illustrates a limit process used in a known CDMA receiver.
Figure 11:
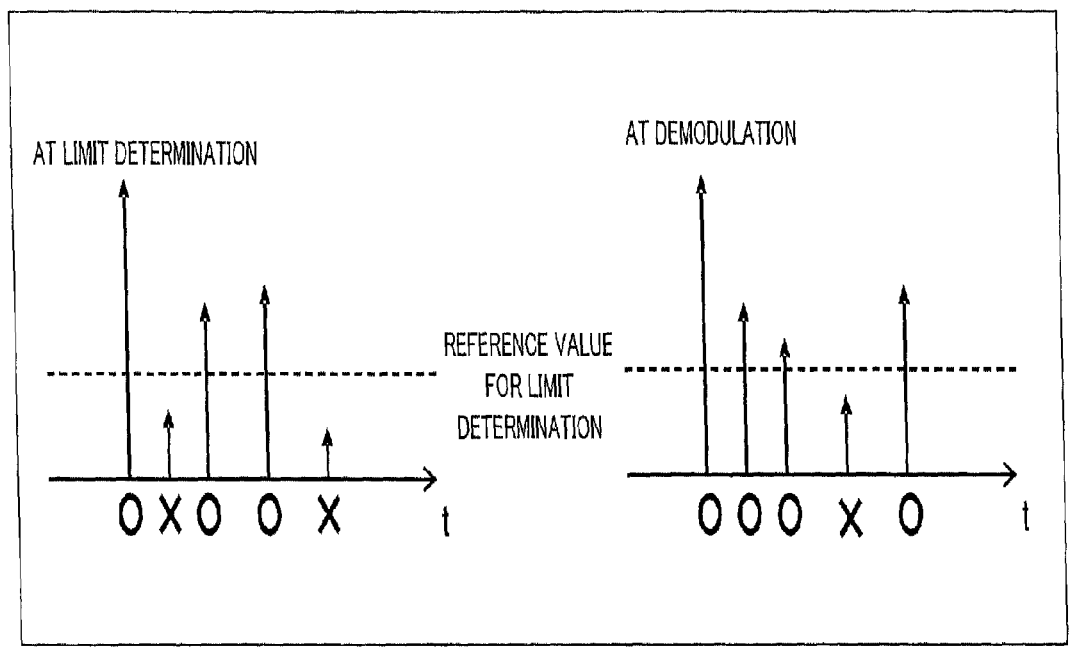
FIG. 11 illustrates a problem regarding the known limit process.
Figure 12:
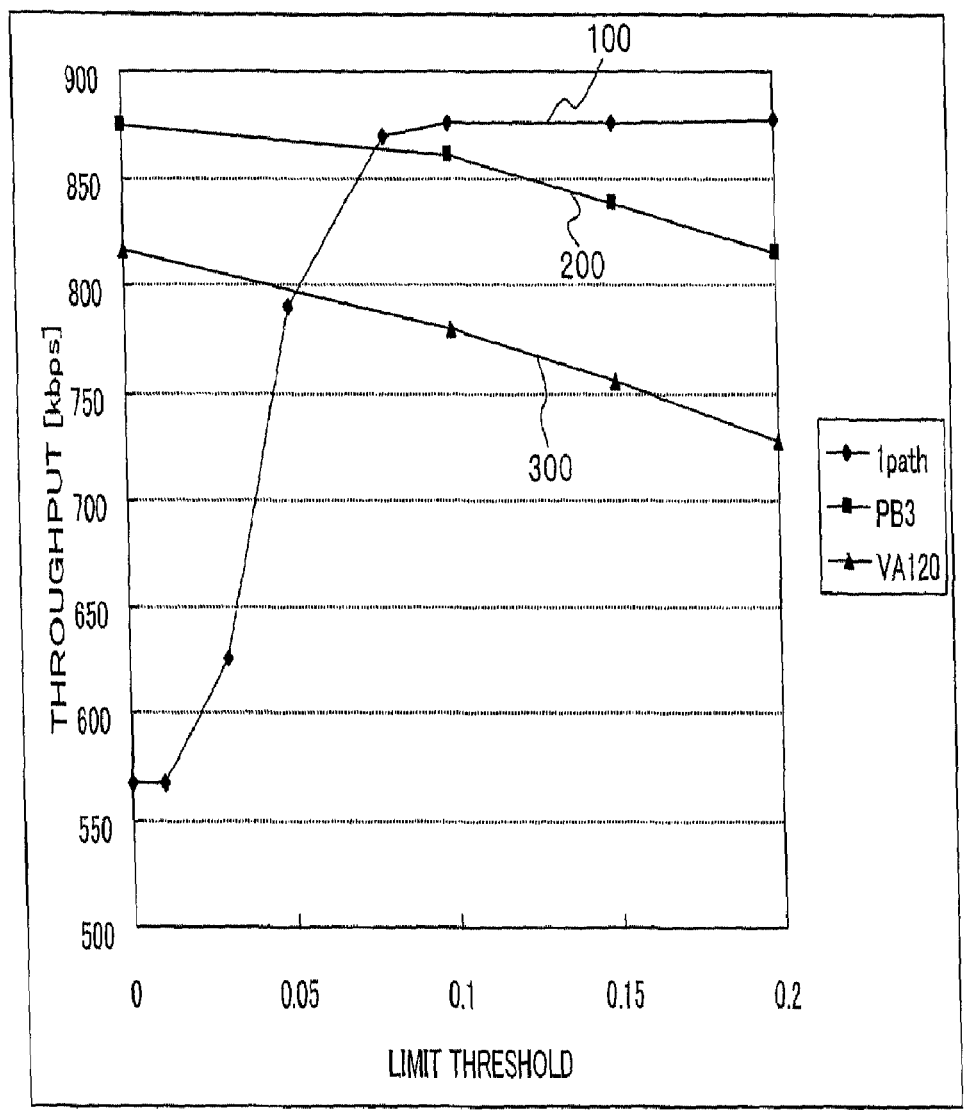
FIG. 12 is a graph showing throughput versus limit threshold in the known limit process.

FIG. 9 is a block diagram of a equalizer in a CDMA receiver in accordance with a third embodiment. The equalizer shown in FIG. 9 is applicable to a receiver system of a wireless terminal such as mobile phone, and includes, for example, an A/D converter 41, a searcher 42, a weighting factor generator 43, delay circuits (FF) 44-1 to 44-n (n is an integer greater than 1), multipliers (45-1 to 45-n), an adder 46, a limit process performing determination part 47, and a despreader 48.

As seen from FIG. 9, this equalizer has generally the similar configuration as the RAKE receiver shown in FIG. 3, and is configured to be operable as equalizer and RAKE receiver for a received signal before being despread.

The A/D converter 41 converts a signal (analog baseband signal) that is received by a receiving antenna (not shown) and subjected to necessary radio reception processes including low-noise amplification, frequency conversion (down conversion), automatic gain control (linear amplification), and quadrature detection, into a digital signal.

The searcher (delay profile generating means) 42 performs path search using e.g. a matched filter for the output of the A/D converter 41, generates a delay profile, and provides the information of each path timing to the weighting factor generator 43. The delay profile will be measured for a sufficiently longer time than that of fading variation and averaged, after performing the path search multiple times.

Each delay circuit 44-i (i=1 to n) delays the output of the A/D converter 41 by a predetermined time (for example, one chip time). The weighting factor generator 43 determines correlation values (a correlation matrix) among the paths based on the output of the A/D converter 41 and information for each path timing given by the searcher 42, and generates a weighting factor (tap coefficient) Wi for the output of each delay circuit 44-i based on a corresponding correlation value and a channel estimate that is derived from a known signal (pilot signal).

Each multiplier 45-i multiplies the output of the corresponding delay circuit 44-i by the weighting factor Wi generated by the weighting factor generator 43. The adder 46 sums (combines) the multiplied outputs of the multipliers 45-i. The despreader 48 despreads the output of the adder 46 (equalized output).

Based on the delay profile generated by the searcher 42, the limit process performing determination part (determining means) 47 determines whether the propagation environment of the received signal is one-path or multi-path, by determining whether or not the ratio between the highest path power and the sum of power of the rest of paths (or between the highest path power and the second highest path power) is higher than a reference value for one-path determination, as described above, and controls the weighting factor generator 43 such that, if the environment is determined to be one-path, the limit process is performed, and otherwise, the limit process is not performed.

Again, in this embodiment, the limit process can be performed, for example, by setting to zero the weighting factor Wi corresponding to signals with path timing whose power of channel estimate is lower than a reference value. In other words, the weighting factor generator 43 works as a control means for excluding a signal with timing whose power is equal to or lower than a predetermined threshold in the delay profile from combining by the adder 46 when the propagation environment of the received signal is determined not to be multi-path (but to be one-path) by the limit process performing determination part 47.

In the CDMA receiver configured as the above, a signal that is received by the receiving antenna is subjected to necessary radio reception process including low-noise amplification, frequency conversion (down conversion), automatic gain control (linear amplification), and quadrature detection. Then the signal is input to the A/D converter 41, converted to an analog baseband signal by the A/D converter 41, and input to the searcher 42, the weighting factor generator 43, and each delay circuit 44-i.

The searcher 42 performs path search for the output of the A/D converter 41, generates a delay profile measured for a sufficiently longer time than that of fading variation and averaged, and provides highly correlated path timings to the weighting factor generator 43.

Each delay circuit 44-i delays the output of the A/D converter 41 by unit time (one chip time) and gives its output signal at each timing to the multiplier 45-i.

In the meantime, the limit process performing determination part 47 performs the one path determination as described above based on the delay profile generated by the searcher 42. If the environment is determined to be one path, the limit process is performed. If the environment is determined to be multi-path, the limit process is not performed.

More specifically, if the environment is determined to be one path, the weighting factor generator 43 sets to zero a weighting factor (tap coefficient) Wi for a path whose power of channel estimation is lower than a reference value. If the environment is determined to be multi-path, the weighting factor generator 13 validates a weighting factor Wi for each generated timing and provides each weighting factor Wi to the multiplier 45-i.

In this embodiment, if the same value as that for the RAKE receiver in the first and second embodiments (Rake combining factor) is used as weighting factor Wi when the environment is determined to be one-path, the equalizer shown in FIG. 9 is operable as RAKE receiver.

In one-path environment where the limit process should be performed, the gain of the equalizer is not so high, and performance degradation due to a signal with invalid timing included in the combining may occur.

Therefore, if the propagation environment of a received signal is determined to be one-path by the limit process performing determination part 47, and when the limit process is performed, weighting factors Wi after the limit process is used as RAKE combining factors instead of performing equalizing process. Thereby, any signal with invalid timing can be removed and performance can be improved.

The outputs of the multipliers 45-i are summed by the adder 16, which result is despread by the despreader 48 and demodulated.

As have been described in detail, the present technique can improve performance in one-path environment while reducing performance degradation in multi-path environment, and thus is very suitable for applications of radio communication technology.

[D] Others

Although, in the above described embodiments, the present technique has been applied to a RAKE receiver and equalize by way of example, the present technique can also be applied to any other demodulation scheme using similar principle (configuration for weightedly combining received signal sequences with different timings).

What is claimed is:

1. A receiver, comprising:
    a delay profile generating unit to generate a delay profile from a received signal;
    a combining unit operable to combine multiple received signals with different timings;
    a determining unit to determine whether or not the propagation environment of the received signals is multi-path, based on the delay profile generated by the delay profile generating unit; and
    a control unit operable to exclude any signal with timing whose power is equal to or lower than a predetermined threshold in the delay profile from the combining by the combining unit upon determination by the determining unit not being multi-path.

2. The receiver according to claim 1, wherein the determining unit determines the propagation environment not being multi-path, upon the ratio between the power of path timing whose power is the highest and the sum of power of the rest of path timings in the delay profile being higher than a predetermined reference value.

3. The receiver according to claim 1, wherein the determining unit determines the propagation environment not being multi-path, upon the ratio between the power of path timing whose power is the highest and the power of path timing whose power is the second highest in the delay profile being higher than a predetermined reference value.

4. The receiver according to claim 1, wherein the control unit excludes any signal with path timing whose power is equal to or lower than the predetermined threshold from the combining by setting to zero the weightedly combining factor for the combining unit corresponding to the signal.

5. The receiver according to claim 1, wherein multiple received signals with different timings being subject to combine by the combining unit are signals with path timings in the delay profile.

6. The receiver according to claim 1, wherein the multiple received signals with different timings being subjected to combine by the combining unit are any of the signals delayed multiple times to equalize the received signals.

7. The receiver according to claim 4, wherein the weightedly combining factor is a RAKE combining factor used in a RAKE combining process or a tap coefficient used in an equalizing process.

8. A reception processing method, comprising the steps of:
    generating a delay profile from a received signal;
    combining multiple received signals with different timings;
    determining whether or not the propagation environment of the received signals is multi-path, based on the delay profile generated by the generating step; and
    controlling such that, upon the propagation environment being determined not being multi-path by the determining step, any signal with timing whose power is equal to or smaller than a predetermined threshold in the delay profile is excluded from the combining step.

9. The reception processing method according to claim 8, wherein the determining step determines the propagation environment not being multi-path, upon the ratio between the power of path timing whose power is the highest and the sum of power of the rest of path timings in the delay profile being higher than a predetermined reference value.

10. The reception processing method according to claim 8, wherein the determining step determines the propagation environment not being multi-path, upon the ratio between the power of path timing whose power is the highest and the power of path timing whose power is the second highest in the delay profile being higher than a predetermined reference value.

11. The reception processing method according to claim 8, wherein the controlling step excludes any signal with path timing whose power is equal to or lower than the predetermined threshold from the combining by setting to zero the weightedly combining factor for the combining unit corresponding to the signal.

12. The reception processing method according to claim 8, wherein multiple received signals with different timings being subjected to combine in the combining step are signals with path timings in the delay profile.

13. The reception processing method according to claim 8, wherein the multiple received signals with different timings being subjected to combine in the combining step are any of the signals delayed multiple times to equalize the received signals.

14. The reception processing method according to claim 11, wherein the weightedly combining factor is a RAKE combining factor used in a RAKE combining process or a tap coefficient used in an equalizing process.

* * * * *